Figure 4:
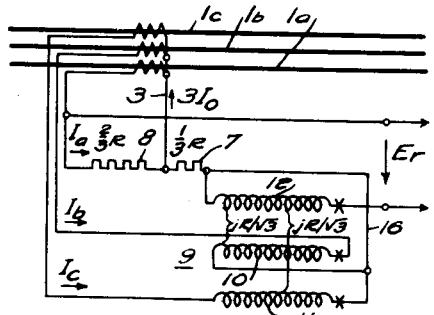

June 13, 1939.  B. E. LENEHAN  2,161,829
PHASE-SEQUENCE FILTER
Filed Jan. 28, 1938  2 Sheets-Sheet 1
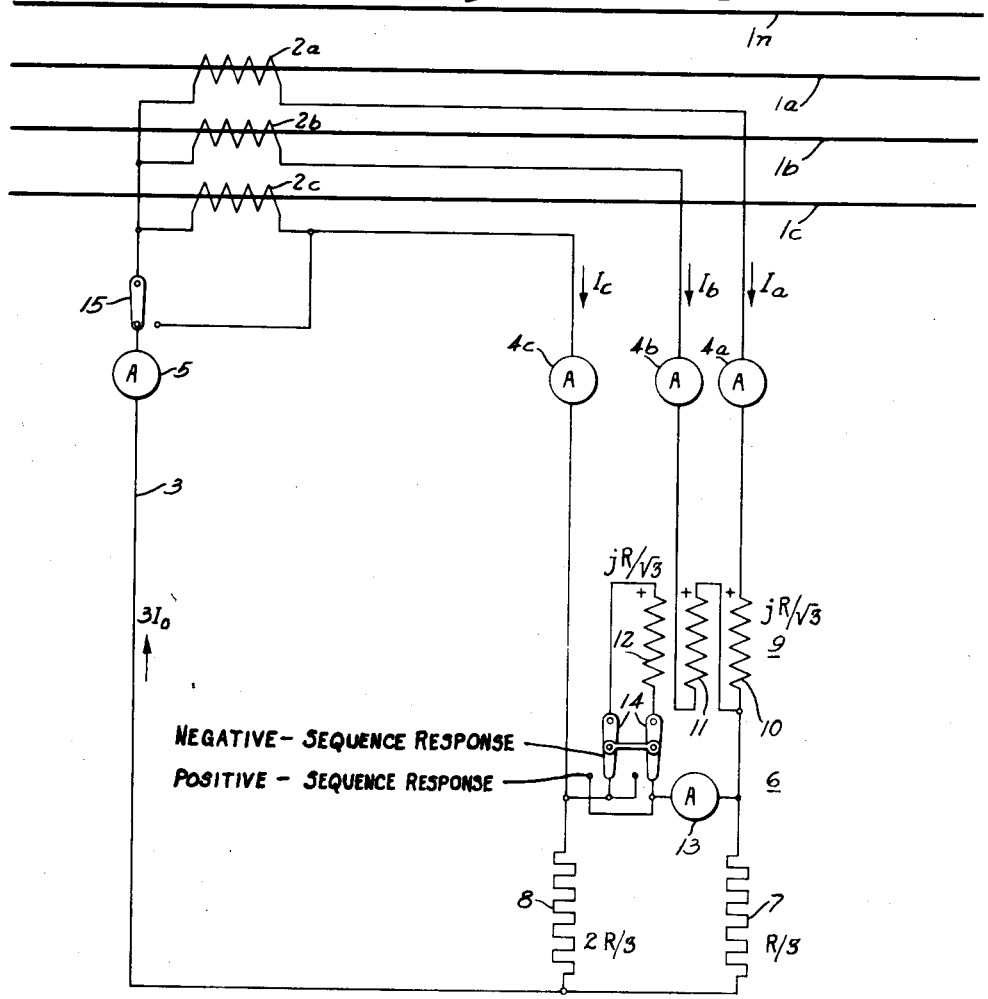
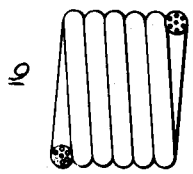
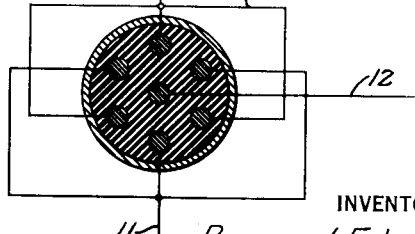
WITNESSES:
Michael Stark
G. O. Harrison
INVENTOR
Bernard E. Lenehan.
BY
ATTORNEY June 13, 1939.  B. E. LENEHAN  2,161,829
PHASE-SEQUENCE FILTER
Filed Jan. 28, 1938  2 Sheets-Sheet 2

WITNESSES:
C.A. McCloskey
Chas. C. Froome

INVENTOR
Bernard E. Lenehan.
BY O.B. Buchanan
ATTORNEY

Patented June 13, 1939

2,161,829

UNITED STATES PATENT OFFICE 2,161,829

PHASE-SEQUENCE FILTER

Bernard E. Lenehan, Bloomfield, N. J., assignor to Westinghouse Electric & Manufacturing Company, East Pittsburgh, Pa., a corporation of Pennsylvania Application January 28, 1938, Serial No. 187,510

7 Claims.  (Cl. 172—245)

This application is a substitute for, and a continuation-in-part of, my application Serial No. 78,109, filed May 6, 1936.

My invention relates to alternating-current apparatus of the type responsive to symmetrical components of polyphase variables, and particularly to phase-sequence filters for segregating either the positive-sequence symmetrical component or the negative-sequence symmetrical component from a polyphase variable (and particularly a three-phase current) of a type which may have any or all three of the symmetrical components, positive-sequence, negative-sequence and/or zero-sequence, commonly distinguished by the subscripts 1, 2 and 0, respectively.

Although the invention, in its broader aspects, is applicable to phase-sequence filters generally, it is particularly useful in connection with current-filters designed for operation at comparatively low current-transformer burdens, such as those operated from bushing-type line-current transformers.

Such filters, as heretofore developed, when utilized on polyphase systems susceptible of having zero-sequence currents, have required the use of delta-connected or differentially connected line-current transformers, or they have required the use of at least two auxiliary current-transformers, or one additional line-current transformer, in order to eliminate the zero-sequence current present in the output of the three line-current transformers ordinarily provided at relaying or metering stations. The auxiliary current-transformers, although lower in first cost than a single line-current transformer, are frequently objectionable from the standpoint of the burden imposed on the line-current transformers.

It is an object of my invention to provide a novel phase-sequence filter for use in three-phase four-wire (or grounded) systems, which will require no inductive apparatus additional to the reactive element of the filter itself, for the elimination of zero-sequence current.

Another object of my invention is to provide a novel phase-sequence filter which is applicable, without substantial change, to both three-phase three-wire and three-phase four-wire (or grounded) circuits.

A further object of my invention is to provide a novel phase-sequence filter which will provide an inherently high volt-ampere output in comparison with the total burden imposed by the phase-sequence apparatus.

The theory of symmetrical components, as involved in the present application, was originated by Dr. C. L. Fortescue, and is fully expounded in the recent technical literature relating to alternating currents. One of the more recent works on this subject is "Symmetrical Components", by C. F. Wagner and R. D. Evans, published by McGraw Hill Book Company.

In segregating the positive- or negative-sequence components of a polyphase variable by means of a static filter, it is necessary to obtain two electrical quantities proportional to two line-variables but rotated through such angles that the sum of their phase-angles, with reference to the corresponding line-variables, is ±120°. This relationship is necessary in order for the operators $a$ or $a^2$ (mentioned below) to appear in the segregated variable. In its broader aspects, my invention involves a novel method of, and means for, producing this vector-rotation, of general application to phase-sequence filters.

In accordance with a principle of my invention, two impedance-drops, respectively proportioned to the sum and difference of two line-variables and related thereto by complex constants having the vector-ratio of $$\frac{1}{3} \text{ to } \frac{j}{\sqrt{3}}$$

respectively, are added to produce the necessary vector-rotation.

Figure 8:
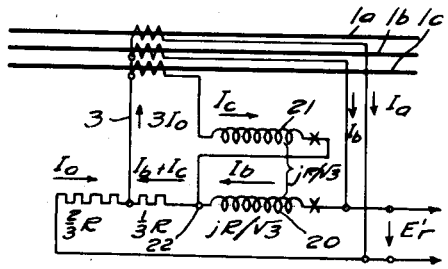
Figure 9:
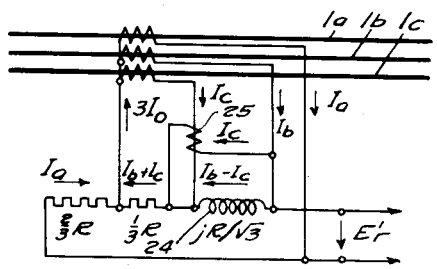
Figure 10:
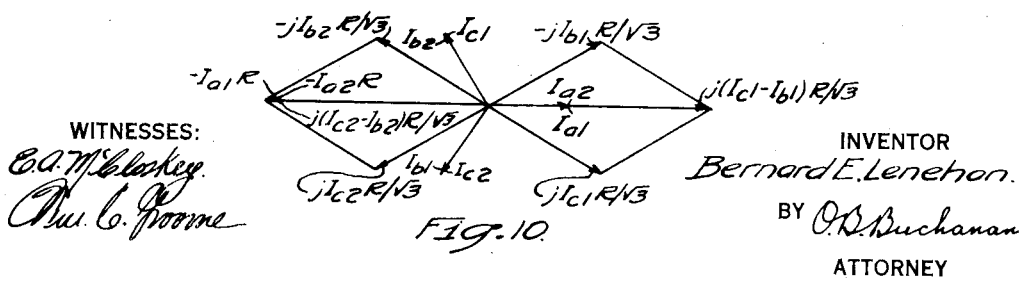

With the foregoing and other objects in view, my invention consists in the circuits, instrumentalities, systems, combinations and methods hereinafter described and claimed, and illustrated in the accompanying drawings, wherein Figure 1 is a diagrammatic view of a phase-sequence current-filter embodying my invention, Fig. 2 is a diagrammatic view showing one construction of a mutual-impedance device which may be used in the filter of Fig. 1, Fig. 3 is a diagrammatic view showing the electrical connections of the device shown in Fig. 2, Figs. 4 to 9 are diagrammatic views of circuits and apparatus illustrating my network in several different forms of embodiment, as hereinafter described, and Fig. 10 is a vector-diagram illustrating the network.

Referring to Fig. 1, in detail, a three-phase four-wire alternating-current power-circuit 1, having phase-wires or conductors $1a$, $1b$ and $1c$ and a neutral wire or conductor $1n$, is provided with a bank of current-transformers $2a$, $2b$ and $2c$, connected in the phase-conductors $1a$, $1b$ and $1c$, respectively, and having their secondary windings connected, in star, to a secondary neutral conductor 3, in a well-known manner. By the expressions "neutral wire" or "neutral conductor", I means to include grounded systems in which the neutral wire or conductor is simply the earth or ground.

A set of line-current-responsive translating devices 4a, 4b and 4c, which may be meters, relays or other alternating-current devices, are individually connected in series with the secondary windings of the current-transformers 2a, 2b and 2c, respectively, to respond to the phase-currents of the power-circuit 1. Another translating device 5, responsive to neutral- or ground-current, is connected in series with the secondary neutral conductor 3 to respond to the zero-sequence or ground current of the circuit 1, in a well-known manner.

The phase-sequence filter of my invention, denoted generally by the reference numeral 6, comprises an impedance 7, an impedance 8 and a mutual-impedance device or three-winding reactor 9 having two primary windings 10 and 11 and a secondary winding 12. The polarities of the three reactor-windings 10, 11 and 12 are indicated by polarity-marks x. In the preferred form of the invention, shown in Fig. 1, the impedances 7 and 8 are substantially pure resistance, and the mutual impedance 9 is substantially pure inductance, but, as will be hereinafter pointed out, the invention may be practiced with impedances of various power-factor angles.

The impedance relationships of the elements 7, 8 and 9 are as follows: Assuming the impedance 7 to be pure resistance of a value $R/3$, the impedance 8 is also pure resistance of a value $2R/3$, and the mutual-impedance device 9 is designed to have a substantially pure mutual inductance of each primary winding 10 or 11 to the secondary winding 12 of a value $$jR/\sqrt{3}$$

where the symbols correspond to quantities as hereinafter designated.

A phase-sequence-responsive relay or other translating device 13, to be energized in accordance with the segregated phase-sequence component, is connected in a local circuit with the secondary winding 12 and the impedances 7 and 8, to respond to the sum of the impedance-drops developed by the impedance elements 7, 8 and 9.

The particular connections shown in Fig. 1 are as follows: The two primary windings 10 and 11 are connected in series, with their junction-point connected to a junction-point between the phase-sequence-responsive device 13 and the resistor 7. The secondary currents $I_a$, $I_b$ and $I_c$ are supplied, respectively, to the free terminal of the primary winding 10, to the free terminal of the primary winding 11, and to a junction-point between the resistor 8 and one terminal of the secondary winding 12, the other terminal of which is connected to the free terminal of the phase-sequence-responsive device 13. The remaining terminals of the resistors 7 and 8 are connected together and to the neutral conductor 3.

A switch 14 may be associated with the network, for reversing the connections of the secondary winding 12, to thereby change the segregated variable from the negative-sequence current to the positive-sequence current, or vice versa.

A switch 15 may be associated with the current-transformers 2a, 2b, 2c, for establishing three-phase, three-wire connections of the apparatus, in the event that the neutral conductor 1n is not used, in which case it is possible to eliminate one of the current-transformers, such as 2c.

In the operation of the apparatus, with three-phase current flowing in the power-circuit 1, the impedances 7 and 8 and the mutual-impedance device 9 develop voltage-drops whose total is selectively proportional solely to the negative-sequence component of current in the circuit 1, as may be seen from the following:

Let $I_a$ = secondary current of the a-phase current-transformer 2a $I_b$ = secondary current of the b-phase current-transformer 2b $I_c$ = secondary current of the c-phase current-transformer 2c $2R/3$ = resistance of the resistor 8

$R/3$ = resistance of the resistor 7

$jR/\sqrt{3}$ = mutual inductance of either primary winding of the device 9 with reference to the secondary winding 12

$E_r$ = voltage impressed on the phase-sequence-responsive relay or translating device 13

$I_0$ = a-phase zero-sequence component of current-transformer secondary current $I_1$ = a-phase positive-sequence component of current-transformer secondary current $I_2$ = a-phase negative-sequence component of current-transformer secondary current $e$ = base of natural logarithms.

$j = 90°$ rotational operator $= e^{j90°} = \sqrt{-1}$ $a = e^{j120°} = -\frac{1}{2} + j\frac{1}{2}\sqrt{3}$ $a^2 = e^{j240°} = -\frac{1}{2} - j\frac{1}{2}\sqrt{3}$ $a^3 = e^{j360°} = 1$.

The properties of the network in Fig. 1 are determined by first considering the open-circuit relaying-voltage $E'_r$, that is, the voltage generated within the network across the relay-terminals 13 when the relay 13 is open-circuited, so that no relaying current $I_r$ is flowing in the relay 13. When the relaying circuit is completed, its current $I_r$ is simply superimposed upon the currents $I_a$, $I_b$ and $I_c$ already flowing in the network, producing an actual relaying-circuit voltage, $$E_r = E'_r - I_r Z_F \quad\quad\quad\quad\quad (1)$$

in which $Z_F$ is the internal impedance of the network or phase-sequence filter 6, or $$Z_F = R + jR/\sqrt{3} \quad\quad\quad\quad\quad (2)$$

From Equation (1), it is obvious that the relaying current $I_r$ is produced by, and proportional to, the internal network-voltage $E'_r$, so that the relaying voltage $E_r$ is also directly proportional to $E'_r$, whether the relaying current $I_r$ be large or small.

Referring to Fig. 1, when no relaying current is drawn by the phase-sequence-responsive relay or other device 13, a circuit may be traced, through the network, from one terminal of the relay 13 to the other terminal thereof, and the sum of all voltages in this circuit must be zero. Thus $$0 = -E'_r + j(I_a - I_b)R/\sqrt{3} + (I_a + I_b)R/3 - 2I_c R/3 \quad (3)$$

The symmetrical-component relationships may be stated as $$\left.\begin{array}{l}I_a = I_1 + I_2 + I_0 \\ I_b = a^2 I_1 + a I_2 + I_0 \\ I_c = a I_1 + a^2 I_2 + I_0\end{array}\right\} \quad\quad (4)$$

Substituting, for the line-currents, their sequence-components as expressed in Equation 4, Equation 3 becomes $$E'_r = \frac{j\sqrt{3}R}{3}[(1-a^2)I_1+(1-a)I_2] + \frac{R}{3}[(1+a^2)I_1 + (1+a)I_2 + 2I_0] - \frac{2R}{3}(aI_1+a^2I_2+I_0)$$

Collecting coefficients of sequence-currents and noting that $$j\sqrt{3}(1-a^2) = 3a, \; j\sqrt{3}(1-a) = -3a^2, \; (1+a^2) = -a$$
and $(1+a) = -a^2$ $$E'_r = \frac{R}{3}[(3a-a-2a)I_1 - (3a^2+a^2+2a^2)I_2 + (2-2)I_0]$$

$$= -2a^2RI_2 \quad\quad\quad\quad\quad\quad\quad\quad\quad\quad (5)$$

Although the impedance elements 7 and 8 have been treated as pure resistance, and the impedance element 9 as pure inductance, it should be understood that the invention may be practiced with other forms of impedances provided that those impedances have the relative vector values of $$1/3, \; 2/3 \text{ and } j/\sqrt{3}$$

respectively. In the general case where the impedance of element 7 is not a pure resistance, it may be expressed as $$\frac{1}{3}Re^{i\theta}$$

The impedances of elements 8 and 9 then become $$\frac{2}{3}Re^{i\theta}$$

and $$\frac{jR}{\sqrt{3}}e^{i\theta}$$

respectively, in accordance with the relationship stated above.

The invention, in its broader aspects, is also applicable to the segregation of symmetrical components of other electrical variables than current.

In order to energize the device 13 in accordance with the positive-sequence symmetrical components of the line-current, the switch 14 is moved to its left-hand position on the figure, thereby reversing the phase of the voltage induced in the secondary winding 12.

In order to establish three-phase three-wire connections of the filter 6, the switch 15 may be moved to the right, and the current-transformer 2c removed.

It will be noted that, in the case of a three-phase three-wire circuit, the sum of two line-variables such as $I_a+I_b$ is equal and opposite to the remaining line-variable $I_c$. Inasmuch as the $$(I_a+I_b)\frac{R}{3}$$

voltage-component and the $$-I_c\frac{2R}{3}$$

voltage-component, in such a case, are necessarily in phase, they may be added and represented as a single voltage-component $(I_a+I_b)R$ for the case of three-phase three-wire circuits. The impedance-ratio then simplifies to $$1 : j/\sqrt{3}$$

rather than $$1/3 : 2/3 : j/\sqrt{3}$$

Figs. 2 and 3 show a preferred construction of the mutual-impedance device 9 from a seven-conductor insulated cable. The cable is coiled, as shown in Fig. 2, and alternate outside conductors are connected in parallel to form the two primary windings 10 and 11 as indicated in Fig. 3. The center conductor of the cable is preferably used as the secondary winding 12. The number and diameter of turns of the coiled cable are calculated in accordance with the usual principles to provide the necessary values of mutual inductance.

If any other phase had been called the principal-phase $a$, the absolute magnitude $\bar{E}'_r$ of the relaying voltage $E'_r$ would have been the same. Thus, if the $c$ phase of Fig. 1 had been lettered $a$, and the other phases renumbered accordingly, noting that phase-$b$ is always the phase which lags phase-$a$ by 120°, we would have the circuit shown in Fig. 4, in which $$E'_r = -\frac{2R}{3}I_a + \frac{R}{3}(I_b+I_c) + j\frac{\sqrt{3}R}{3}(I_b-I_c)$$

$$= -2RI_2 \quad\quad\quad\quad\quad\quad\quad\quad (6)$$

which has the same absolute value as $-2a^2RI_2$ in Equation 5.

Referring again to Fig. 4, it may also be considered that the phase-$a$ current flows all the way through both resistors 8 and 7, totalling R, to the junction-point 16 with the reactor-windings 10 and 11 and that the neutral current $3I_0$ flows back through $R/3$ to the return-conductor 3. Then $$E'_r = -RI_a + RI_0 + j\frac{\sqrt{3}R}{3}(I_b-I_c) \quad\quad (7)$$

$$= -R(I_1+I_2+I_0) + RI_0 + R(I_1-I_2) \quad\quad (8)$$

$$= -2RI_2 \quad\quad\quad\quad\quad\quad\quad\quad (9)$$

which is the same response as before. This is necessarily so, because, from Equation 4, $I_a+I_b+I_c = 3I_0$, and $(I_b+I_c) = -I_a + 3I_0$.

From Equation 7, the broad principle may be deduced that the response to the positive-sequence current $I_1$ may be eliminated by making the resultant of the impedance-drops due to the two positive-sequence currents $I_{b1}$ and $I_{c1}$ in phases $b$ and $c$, including the inductance $$jR/\sqrt{3}$$

equal and opposite to the resistance-drop due to the positive-sequence $a$-phase current $I_{a1}$ flowing through the resistance $R$. The zero-sequence component is then removed by passing the neutral current $3I_0$ through a resistance equivalent to $R/3$.

Other equivalent connections for introducing the impedance-responses $$I_aR, \; -(I_a+I_b+I_c)R/3 \text{ and } j(I_c-I_b)R/\sqrt{3}$$

in the measuring or relaying circuit, will readily suggest themselves to those familiar with such circuits.

Referring to Fig. 10, the problem is first to provide a network which will respond solely to the negative-sequence current (or to the positive-sequence current, if the latter is desired), and then to introduce a factor $-RI_0$, which is obtained by passing the neutral current, $3I_0 = I_a+I_b+I_c$, through the resistance $R/3$. The negative-sequence network is characterized by having a resistance-branch R which is traversed by one of the phase-currents $I_a$, and leading and lagging impedance-branches $$jR/\sqrt{3}$$

in the other two branches, traversed by the other two phase-currents $I_b$ and $I_c$. These relative magnitudes and phase-angles of the resistance- and impedance-branches are so chosen that, for the negative phase-sequence currents, $I_{a2}$, $I_{b2}$, $I_{c2}$, the impedance-drops will be additive, giving a negative phase-sequence response, whereas, for positive phase-sequence currents, $I_{a1}$, $I_{b1}$, $I_{c1}$, the resultant of the responses to $I_{b1}$ and $I_{c1}$ will exactly neutralize the response to $I_{a1}$, thus avoiding any response to positive phase-sequence currents.

The positive and negative phase-sequence currents are usually referred to as the rotational phase-sequence components, as distinguished from the zero phase-sequence components. It will readily be understood, from the mathematical equations and from Fig. 10, that either the positive-sequence response or the negative-sequence response can be obtained, according to the sign of the resultant reactive voltage-drop $$\pm j(I_b - I_c)R/\sqrt{3}$$

Certain illustrative variations in the network are shown in Figs. 5 to 9, inclusive.

Figure 5:
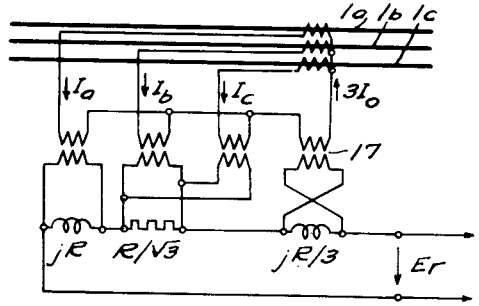

In the phase-sequence network shown in Fig. 5, I utilize a plurality of two-winding auxiliary current-transformers 17, having a 1:1 ratio, or any other convenient ratio, for supplying current to two inductances $jR$ and $jR/3$ and a resistor $$R/\sqrt{3}$$

The connections of the current-transformer 17 are made so as to obtain the following voltage-drops in the measuring or relaying circuit:

$$E'_r = jRI_a + \frac{\sqrt{3}R}{3}(I_b - I_c) - jRI_0 = j2RI_2 \quad \text{(10)}$$

which has the same scalar value as $-2a^2RI_2$ in Equation 5.

It is not necessary that the phase-angle of the impedance in the $(I_c - I_b)$ branch should lead the impedance $R$ in the $I_a$ branch by 90°, as indicated by the operator $j$, as this impedance may have a lagging phase-angle $-j$, representing a capacitance, in which case, the current $(I_c - I_b)$ would have to be passed through the impedance in the opposite direction, in order to obtain the same phase-sequence response.

Figure 6:
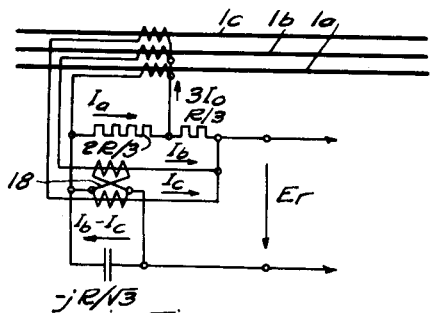

Fig. 6 illustrates a network having a capacitor $$-jR/\sqrt{3}$$

in place of an inductance $$jR/\sqrt{3}$$

The $(I_b - I_c)$ current is supplied by two auxiliary current-transformers 18 in the circuits traversed by $I_b$ and $I_c$, respectively, as indicated in Fig. 6.

In Fig. 6, the internal voltage of the network is $$E'_r = -\frac{j\sqrt{3}R}{3}(I_b - I_c) + \frac{2R}{3}I_a - \frac{R}{3}(I_b + I_c) = 2RI_2 \quad \text{(11)}$$

In general, in regard to the phase-angles of the impedances making up my network for eliminating the positive-sequence response, the only essential is that the resultant of the positive-phase-sequence responses to $(I_c - I_b)$, in one of the impedance-branches, shall be equal in magnitude and exactly opposite in phase, to the impedance-drop in the other branch which is responsive to the $I_a$ current. If the same impedance is to be traversed by $I_b$ and $I_c$, this means that this impedance must be displaced by 90° in either the leading or lagging direction, with respect to the impedance in the $I_a$ branch; although, if impedances having different phase-angles are utilized in the $I_b$ and $I_c$ branches, the resultant of these two impedance-drops may be made equal and opposite to the impedance-drop in the $I_a$ branch, for positive-sequence current, without having an exactly 90° phase-angle difference between the $I_a$ impedance and the impedances traversed by $I_b$ and $I_c$. For the 90° impedance-relation, the absolute value of the impedance of the $I_a$ branch is $$\sqrt{3}$$

times the absolute value of the impedance in the $(I_c - I_b)$ branch. The zero-sequence response is eliminated by introducing an $I_0$ voltage-drop which is equal and opposite to one-third of the voltage-drop in the $I_a$ phase.

Figure 7:
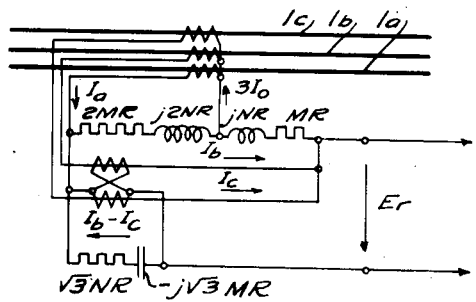

Fig. 7 illustrates a generalized condition, in a network in which the $I_a$ impedance consists of a resistance $3MR$ and an inductance $j3NR$, and the $(I_c - I_b)$ impedance consists of a resistance $$\sqrt{3}NR$$

and a capacitance $$-j\sqrt{3}MR$$

while the zero-sequence impedance is represented by one-third of the $I_a$ impedance, or $(MR + jNR)$.

In Fig. 7, the internal voltage of the network is $$E'_r = j\sqrt{3}R(M+jN)(I_c - I_b) + 2R(M+jN)I_a - R(M+jN)(I_b + I_c) = 6RI_2(M+jN) \quad \text{(12)}$$

In Fig. 8, I show, by way of example, another network for obtaining the selective response to the negative phase-sequence current to the exclusion of the positive and zero phase-sequence components. This network utilizes a two-winding reactor 20, 21, in lieu of the three-winding reactor 6 of Fig. 1. The $I_a$ current is led through a resistor $2R/3$ to the neutral return-conductor 3. The $I_b$ and $I_c$ currents are passed, in opposite directions, through the reactor-windings 20 and 21, respectively, to a junction-point 22, from which the combined currents $(I_b + I_c)$ are led through a resistor $R/3$ to the neutral return-conductor 3.

In Fig. 8, the internal voltage of the network is $$E'_r = \frac{2}{3}RI_a - \frac{1}{3}R(I_b + I_c) + j\frac{\sqrt{3}}{3}R(I_c - I_b) = 2RI_2 \quad \text{(13)}$$

In Fig. 9, I show a network utilizing a self-inductance winding 24 having an impedance $$jR/\sqrt{3}$$

and an auxiliary current-transformer 25 for subtracting the $I_c$ current from the $I_b$ current, producing a resultant current $(I_b - I_c)$ which is passed through the inductance $$jR/\sqrt{3}$$

Otherwise, the connections in Fig. 9 are similar to those shown in Fig. 8; and the response is the same as that which is indicated in Equation 13.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. A static phase-sequence filter for segregating a symmetrical component of a three-phase three-wire system of variables comprising a first impedance device having substantially the impedance $Re^{j\theta}$, where $e$ is the base of natural logarithms and R and $\theta$ are any constants, a second impedance device having substantially the impedance $jkRe^{j\theta}$, where $k$ is a factor expressing the ratio of the scalar values of the impedances, coupling means associated with a plurality of phases of said system, circuit-connecting means for so energizing said first impedance device from said coupling means as to produce substantially the effect of a first quantity $(I_a+I_b)Re^{j\theta}$, where $I_a$ and $I_b$ are secondary currents produced by said coupling means from two of the phases of said system, respectively, circuit-connecting means for so energizing said second impedance device from said coupling means as to produce substantially the effect of a second quantity $(I_a-I_b)\, jkKRe^{j\theta}$, where K is a factor expressing the ratio of the effective transformation-ratios of the coupling means in obtaining the effects of the first and second quantities, the factors $k$ and K being so related that $kK$ is substantially equal to $$1/\sqrt{3}$$

and electrical connections for obtaining the vector sum of saird first and second quantities.

2. A static phase-sequence filter for segregating a symmetrical component of a three-phase system of variables, comprising a first impedance device having substantially the impedance $Re^{j\theta}/3$, where $e$ is the base of natural logarithms and R and $\theta$ are any constants, a second impedance device having substantially the impedance $jkRe^{j\theta}$, where $k$ is a factor expressing the ratio of the scalar values of the impedances, a third impedance device having substantially the impedance $2Re^{j\theta}/3$, coupling means associated with a plurality of phases of said system, circuit-connecting means for so energizing said first impedance device from said coupling means as to produce substantially the effect of a first quantity $(I_a+I_b)Re^{j\theta}/3$, where $I_a$ and $I_b$ are secondary currents produced by said coupling means from two of the phases of said system, respectively, circuit-connecting means for so energizing said second impedance device from said coupling means as to produce substantially the effect of a second quantity $(I_a-I_b)\, jkKRe^{j\theta}$, where K is a factor expressing the ratio of the effective transformation-ratios of the coupling means in obtaining the effects of the first and second quantities, the factors $k$ and K being so related that $kK$ is substantially equal to $$1/\sqrt{3}$$

circuit-connecting means for so energizing said third impedance device from said coupling means as to produce substantially the effect of a third quantity $2I_cRe^{j\theta}/3$, where $I_c$ is the secondary current produced by said coupling means from the remaining phase of said system, and electrical connections for obtaining the vector sum of said first, second and third quantities.

3. A static phase-sequence filter for segregating a symmetrical component of a three-phase system of variables comprising a first impedance element, means for causing said first impedance element to be energized in accordance with the vector sum of two phases of said system, a second impedance element, means for causing said second impedance element to be energized in accordance with the vector difference of two phases of said system, a third impedance element, means for causing said third impedance element to be energized in reversed direction in accordance with the remaining phase of said system, said impedance elements having relative impedance values of 1, $$j\sqrt{3}$$

and 2, respectively, and electrical connections for obtaining the resultant of the impedance drops in said first, second and third impedance elements.

4. A static phase-sequence current-filter for segregating a symmetrical component of a three-phase system of currents comprising a first impedance element, means for causing said first impedance element to be energized in accordance with the vector sum of two phase-currents of said system, a mutual impedance device having opposing windings and having a secondary winding, means for causing said opposing windings to be energized in accordance with said two phase-currents, a third impedance element, means for causing said third impedance element to be energized in accordance with the remaining phase-current of said system, and electrical connections for obtaining the resultant of the impedance drops in said first and third impedances and said secondary winding.

5. A static phase-sequence current-filter for segregating a symmetrical component of a three-phase system of currents comprising a first resistor energized in accordance with the vector-sum of two phase-currents of said system, a mutual impedance device having opposing windings energized in accordance with said two phase-currents and having a secondary winding, a second resistor energized in accordance with the remaining phase-current of said system, said first resistor, said mutual-impedance element and said second resistor having impedances in the vector-relation $$R/3 : jR/\sqrt{3} : 2R/3$$

and a local circuit connecting said first resistor and secondary winding in additive voltage-relationship and said second resistor in opposing voltage-relationship.

6. A phase-sequence filtering-network responsive to the three currents $I_a$, $I_b$ and $I_c$ in a three-phase device of a type which may be subject to zero-phase-sequence current-flow, said network comprising a plurality of impedance-portions $Z_a$, $Z_b$ and $Z_c$, means for, in effect, energizing the impedance $Z_a$ with a current substantially proportional to the current $I_a$ in such manner as to obtain substantially an internal network-voltage corresponding to an impedance-drop $I_aZ_a$, means for, in effect, energizing the impedance $Z_b$ with a current substantially proportional to the current $I_b$ in such manner as to obtain substantially an internal network-voltage corresponding to an impedance-drop $I_bZ_b$, means for, in effect, energizing the impedance $Z_c$ with a current substantially proportional to the current $I_c$ in such manner as to obtain substantially an internal network-voltage corresponding to an impedance-drop $I_cZ_c$, and means for producing, in effect, a measuring circuit in which are vectorially added the impedance-drops $I_aZ_a$, $I_bZ_b$ and $I_cZ_c$, characterized by substantially such values of the impedances $Z_a$, $Z_b$ and $Z_c$ that the zero-sequence responses and the rotational $k$-sequence responses make $I_{ao}Z_a + I_{bo}Z_b + I_{co}Z_c = O$ and $$I_{ak}Z_a + I_{bk}Z_b + I_{ck}Z_c = O$$

where $I_{ao}$, $I_{bo}$ and $I_{co}$ and $I_{ak}$, $I_{bk}$ and $I_{ck}$ are, respectively, the zero-sequence and $k$-sequence symmetrical components of $I_a$, $I_b$ and $I_c$, $k$ being either 1 or 2.

7. A phase-sequence filtering-network responsive to the three currents $I_a$, $I_b$ and $I_c$ in a three-phase device of a type which may be subject to zero-phase-sequence current-flow, said network comprising a plurality of impedances including the impedances substantially proportional to $$Z_a \text{ and } \pm jZ_a/\sqrt{3}$$

where $Z_a$ is any impedance; means for, in effect, energizing the impedance proportional to $Z_a$, with a current substantially proportional to the current $I_a$, in such manner as to obtain substantially an internal network-voltage corresponding to an impedance-drop $I_aZ_a$; means for, in effect, energizing the impedance proportional to $$\pm jZ_a/\sqrt{3}$$

with a current substantially proportional to $\pm(I_b-I_c)$, in such manner as to obtain substantially an internal network-voltage corresponding to an impedance-drop $$\pm(I_b-I_c)(jZ_a/\sqrt{3})$$

means for, in effect, energizing an impedance proportional to $\pm Z_a/3$, with a current substantially proportional to $\pm(I_a+I_b+I_c)$, in such manner as to obtain substantially an internal network-voltage corresponding to an impedance-drop $-(I_a+I_b+I_c)Z_a/3$; and means for producing, in effect, a measuring circuit in which are vectorially added the impedance-drops $$I_aZ_a \pm (I_b-I_c)(jZ_a/\sqrt{3})$$

and $-(I_a+I_b+I_c)Z_a/3$.

BERNARD E. LENEHAN.